March 23, 1965 D. W. HAMM 3,174,763
COMPRESSION RING
Filed March 18, 1963

INVENTOR.
DOUGLAS W. HAMM
BY *Price & Heneveld*
ATTORNEYS

United States Patent Office 3,174,763
Patented Mar. 23, 1965

3,174,763
COMPRESSION RING
Douglas W. Hamm, Norton Township, Muskegon County, Mich., assignor to Muskegon Piston Ring Company, Muskegon, Mich., a corporation of Michigan
Filed Mar. 18, 1963, Ser. No. 265,778
5 Claims. (Cl. 277—215)

This invention relates to piston rings, and more particularly to a compression ring of unique construction enabling it to be made from material of continuous ribbon form, rather than individually cast or sliced from a casting.

Compression rings are those basically used in the upper ring grooves of the piston. In this position, their primary function is to prevent the passage of the high temperature, high pressure gases incident to the combustion within the cylinder. So far as temperature and pressure are concerned, such rings must sustain the most adverse ambient operation conditions of any of the rings. Further, they must have sufficient body or mass to be effective heat transfer elements whereby heat from the piston is dissipated through the ring to the cylinder walls where it is absorbed by the cooling system of the engine. For this latter purpose, they must have both mass and substantial area of contact with the cylinder wall.

Because of these reasons, such rings have traditionally been cast, either as individual rings or sliced from a cylindrical cast blank and then machined to the proper tolerances. Such an arrangement means that the rings must be individually fabricated rather than produced by the more economical high speed methods of continuous fabrication from a ribbon-like strip of material.

This invention, for the first time, provides a compression ring which may be economically and satisfactorily fabricated from continuous strip materials, and yet embody the necessary structural characteristics essential for efficient, upper groove operation. This invention provides a ring having the required conformability for effective sealing and the required mass for effective cooling. It provides a continuous outer face which is essential both to provide the necessary strength to resist the high compressive gas loads applied to the ring and to provide the area of cylinder wall contact necessary for proper thermal transmissions. It also provides a ring having improved side sealing effect to control blow-by.

These and other objects and purposes of this invention will be understood by those acquainted with the design and use of piston rings upon reading the following specification and the accompanying drawings.

In executing the objects and purposes of this invention, there is provided a blank having a relatively thin, central portion and relatively thick, marginal portions. The blank is folded over into a U with the bending for this purpose being confined to the relatively thin central portion. The marginal edges of the blank form the outer face of the ring, and in so doing, form a filled outer face.

Figure 1:
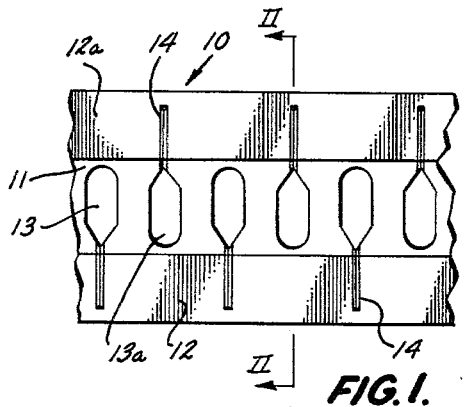
FIG. 1 is a fragmentary view of a ribbon-like blank used for the fabrication of this ring.
Figure 2:
FIG. 2 is a sectional view taken along the plane II—II of FIG. 1.

Referring specifically to the drawings, the numeral 10 refers to a continuous strip or ribbon-like blank which is best seen in FIG. 1. The blank has a central portion 11 of considerably lesser thickness than the side portions 12 and 12a. An example of a satisfactory material for this ring is a blank with side portions 12 and 12a having a thickness of approximately 0.05 of an inch and a central portion of approximately 0.02 of an inch. These dimensions are not to be considered as limitations, but only as illustrative. The blank is provided with a plurality of laterally extending slots 13 and 13a which are confined to the thinner central portion of the blank. Each of the slots has one end which is wedge-shaped, with the wedge-shaped points of the slots being directed oppositely to the wedge-shaped points of the slots 13a. The slots 13 and 13a are arranged alternately along the blank. Narrow, laterally extending strips of the blank remain between the slots 13 and 13a. From the wedge-shaped ends of the slots 13 and 13a, shallow embossments 14 extend outwardly toward the edges of the blank and are impressed in the thicker material of the edge portions 12 and 12a. These later form guides along which the thicker edge portions are fractured to form parting or break lines.

Figure 3:
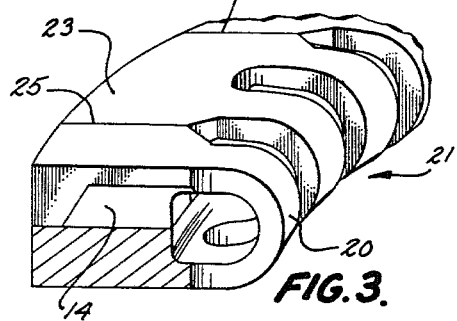
FIG. 3 is a fragmentary oblique view of a ring embodying this invention.

The blank is processed to fold one of the edges 12 or 12a over on the other as best seen in FIG. 3. In this operation, the narrow strips of material which remain between the slots 13 and 13a become the U-shaped struts 20 of the ring 21. These struts are circumferentially spaced around the ring by reason of the slots and are of a thinner material than the remainder of the body of the ring since they are formed entirely from the central portion of the blank.

Figure 4:
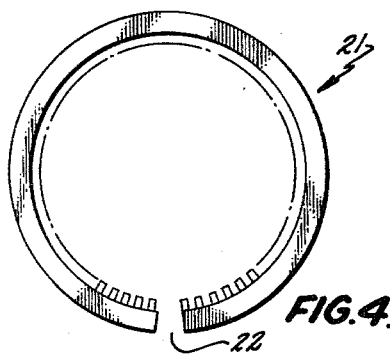
FIG. 4 is a plan view of a ring embodying this invention in open or released condition.
Figure 5:
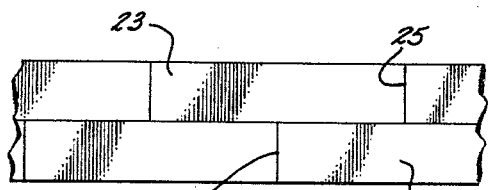
FIG. 5 is a fragmentary enlarged view of the outer face of the ring, when the ring is closed.

In the particular construction of the ring illustrated in FIG. 3, the thickness of each of the side portions 12 and 12a of the ring is equal to one-half of the axial height of the finished ring. Thus, when the bending is completed, these two portions are folded over to seat upon each other, filling the entire outer face of the ring (FIGS. 3 and 5). After the blank has been formed into the cross-sectional shape indicated in FIG. 3, it is coiled into a spiral from which annular rings are cut. This forms a part 22 which, when the ring is in its normal released position, is open as indicated in FIG. 4. However, when the ring is confined within a cylinder, the part 22 is closed.

By fracturing the body of the ring along each of the embossments 14, the thicker outer portion of the ring is divided into a plurality of individual segments 23 which are defined from each other by the break or severance lines 25. It will be recognized that the severance lines 25 may be created in any suitable manner and the reference to "fracturing" is merely illustration. Since the embossments 14 are alternately spaced with respect to each other on opposite sides of the ring, the segments thus formed are off-set circumferentially about the ring as is best indicated in FIG. 5.

Figure 6:
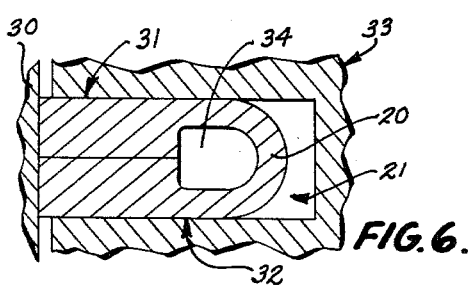
FIG. 6 is a sectional view of a ring embodying this invention seated in a ring groove.

The resulting ring, when seated in a ring groove, occupies the outer portion of the groove (FIG. 6). The filled face of the ring seats against the cylinder wall 30 with the sides of the ring seating against the sides 31 and 32 of the ring groove 33. This fit is such that the friction generated by contact between the sides of the ring and the sides of the ring groove does not interfere with the freedom of radial movement of the ring, whereby it may readily conform to the cylinder wall 30 as the piston is reciprocated.

It will be noted that the inner portion of the ring is hollow, forming an internal opening 34. This is created by the fact that the central portion of the blank is thinner than the outer portions. The spacing of the opposite ends of the struts 20 from each other permits the inner bight portion of the ring to be formed over a radius which does not bend the material to a point where failure occurs or it is weakened to induce early metal failure. The natural resilience of the struts 20 gives the ring some tendency to spread axially, thus making sure of filling the ring groove. This is an effect which cannot be obtained in the conventional cast or solid piece ring. At the same time, the axial struts being circumferentially spaced about the inner periphery of the ring, permit some circumferential compression to take place in this portion of the ring body when the ring is closed to seat in the cylinder. This generates a degree of radial tension, and thus sets up the desired radial forces necessary to make the ring seat properly and effectively against the cylinder 30. In a ring of this construction, the degree of radial tension can be predicted and controlled with greater accuracy than is possible with the conventional one-piece cast ring. This is a significant improvement in the ring.

Figure 7:
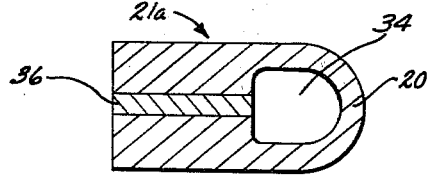
FIGS. 7, 8 and 9 are sectional views of modified forms of rings embodying this invention.

FIG. 7 illustrates a modification of the ring in which the marginal sides of the blank are of somewhat lesser thickness whereby when they are bent over into the U-shape of the finished ring, they do not completely fill the face of the ring. The gap thus formed in the ring 21a is filled with a spacer 36. This spacer is preferably a parted annulus of a suitable material.

The spacer 36 may be of steel or it may be formed of a suitable high temperature resistant, synthetic, resinous material which also has the characteristic of chemical stability in the presence of the hydro-carbon compounds incident to combustion within an internal combustion engine. For example, phenol and phenol-formaldehyde based compounds, either with or without fillers and reinforcements, are an example of a synthetic resinous material suitable for this purpose. When a synthetic resinous material is used for the spacer 36, the material may be reinforced by suitable fibrous materials capable of withstanding high temperature operation, as for example, strands of filamentary glass.

The use of the spacer provides additional sealing by helping to close the ends of the separations 25. In effect it is a continuous seal interposed between the upper and lower segments.

Figure 8:
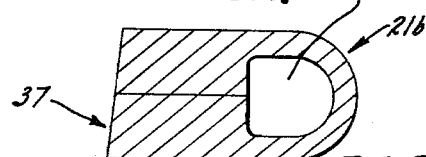

FIG. 8 illustrates a ring 21b which is identical in every way to the ring 21, except the outer face 37 is inclined or tapered at a slight angle to form a scraping edge at one end. The taper may be formed by inclining the edges of the blank from which the ring is formed, or the taper may be applied by machining after a ring of the type illustrated in FIG. 6 has been made. A ring of this configuration would not normally be used in the top ring groove of a piston, but would be applied in the middle ring groove where it serves both as an oil control ring and as a compression retaining ring.

Figure 9:
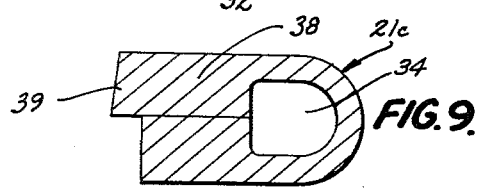

FIG. 9 illustrates a ring 21c which is basically similar to the ring 21b, except that one leg of the U-shaped body of the ring is longer than the other. This can be accomplished by utilizing a blank in which one of the thicker marginal portions 12 or 12a is wider than the other. The longer leg 38 of the ring 21c may have a flat face or it may be tapered as indicated by the face 39. Once again, this is a ring particularly designed for use in the middle ring groove, rather than the top ring groove. As in the case of the ring 21b, reducing the area of contact with the cylinder wall permits more rapid wear-in or conformance to the cylinder wall during initial break-in of the engine.

Figure 10:
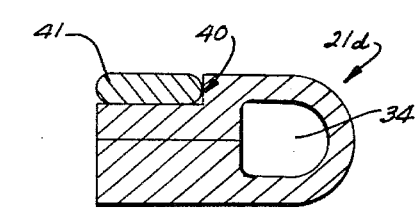
FIG. 10 is a sectional view of a further modified form of this ring combined with a rail.

FIG. 10 illustrates another modification of the ring. In this case, the ring 21d has a recess 40 in one of its side faces of such axial and radial depth that it may receive a rail 41. The rail 41 is of conventional construction, that is a parted rail segment—the part in which is closed when the rail is confined within a cylinder. The rail seats within the recess and forms an additional seal with the cylinder wall. Because the rail is thinner than the remainder of the body of the ring and has freedom of radial movement relative to the rest of the ring, it can wear-in or seat against the cylinder wall more rapidly than the rest of the ring during initial engine break-in. At the same time, the sealing factor of the rail is supported by the additional seal formed by the main body of the ring. Also, because of the heavy cross-sectional structure of the ring, the rail is adequately supported both axially and radially to resist deflection loads due to high pressure and high temperature gases. The ring 21d is particularly designed for intermediate groove operation, although it may be used in the top groove.

The recess 40 may be formed in the blank prior to the blank being folded into the finished shape of the ring. It is also entirely possible that it may be formed by machining the side of the ring after the ring has been formed. This, however, is considered less desirable because it introduces an additional fabrication step which is both time consuming and expensive.

It will be recognized that all of the various forms of this ring which have been described and illustrated may be readily made from a continuous ribbon of material. With modern rolling methods, the ribbon can be made to the various cross-sectional shapes required to form the various types of rings which have been illustrated. Such material may be supplied in a soft or annealed state whereby it is readily shaped to the final configuration of the ring with high speed equipment on a continuous production basis. After the ring has been so shaped, it may be heat treated to give the finished ring the desired characteristics of resiliency, toughness and strength.

This invention for the first time provides a ring suitable for the upper ring grooves which may be fabricated by continuous methods from ribbon-like stock, while at the same time, retaining all of the best characteristics of conventional cast rings. In addition, it has additional advantages in that its radial tension can be more closely controlled and in creating the radial tension by compressing the ring, it is not necessary to compress a solid section, but rather to compress a section (the circumferentially spaced struts 20) which by reason of its structure is much freer to conform to the circumferential compression incident to placing it in the cylinder. Such rings have a longer effective life than cast rings, and at the same time, are less expensive to initially fabricate.

This invention provides a ring for upper ring grooves which is more flexible than any previously conceived compression ring. As such, it has highly desirable conformability to the cylinder wall—far more so than previously known rings. This materially increases the ability of the ring to effect an efficient seal against the cylinder wall.

This ring also overcomes a serious problem which has been experienced in conventional, solid section compression rings. The conventional compression ring may, at high speed, develop vibration and may even reach a point where the ring will begin to vibrate in harmony with the frequency of one of the dominant vibrations of the exciters. At this point, the ring will flutter and a ring, which up to this point, has exhibited good sealing characteristics suddenly fails. This effect is increased by the fact that conventional rings have structural variations which create weak points at which vibration stresses concentrate. Flutter is often initiated at these points and occurs in the ring because of these points at speeds substantially below that at which it would otherwise occur. This effect is known as "point flutter."

This invention provides a structure which avoids this effect. Not being a solid structure, this invention provides a ring which is self-dampening, preventing the ring from experiencing flutter. Being a series of relatively independent, short segments, there is no substantial continuous length of metal along which vibrations can travel to concentrate at a single point. Further, the plurality of substantially independent segments prevents the build-up of harmonious vibration responses.

While a preferred embodiment of this invention has been illustrated and described, together with various modifications of the invention, it will be understood that additional modifications may be made which will embody the principles of the invention. Such modifications are to be considered as covered by the hereinafter appended claims, unless these claims by their language expressly state otherwise.

I claim:

1. A compression ring comprising in cross section a U-shaped body having a radial outer portion and a radially inner portion; said radially outer portion forming a filled outer radial face; said radially inner portion being hollow and divided into a plurality of circumferentially spaced struts; said outer portion having an upper row and a lower row of segments, said segments in each row being structurally separated by severance lines; the severance lines in one row being circumferentially off-set from the severance lines in the other row; said struts being cross-sectionally thinner than said segments and joining the segments of one of said rows to the segments of the other of said rows; said body being formed from a single integral piece of material; said upper row of segments being axially spaced from said lower row of segments to form a circumferential recess opening through the outer radial face of said ring; an annular parted separator seated in said recess between said rows of segments.

2. A compression ring as described in claim 1 wherein said separator is metallic.

3. A compression ring as described in claim 1 wherein said separator is of a high temperature resistance synthetic resinous material.

4. A compression ring as described in claim 3 wherein said separator incorporates fibrous reinforcement.

5. A compression ring as described in claim 1 wherein said separator has a radial width substantially equal to that of said radially outer portion.

References Cited in the file of this patent
UNITED STATES PATENTS

| | | |
|---|---|---|
| 2,280,743 | Bowers | Apr. 21, 1942 |
| 2,296,332 | Bowers | Sept. 22, 1942 |
| 3,053,545 | Knocke | Sept. 11, 1962 |